May 28, 1957 V. J. JANDASEK 2,793,726
HYDRAULIC TORQUE CONVERTER
Filed May 5, 1954 2 Sheets-Sheet 1
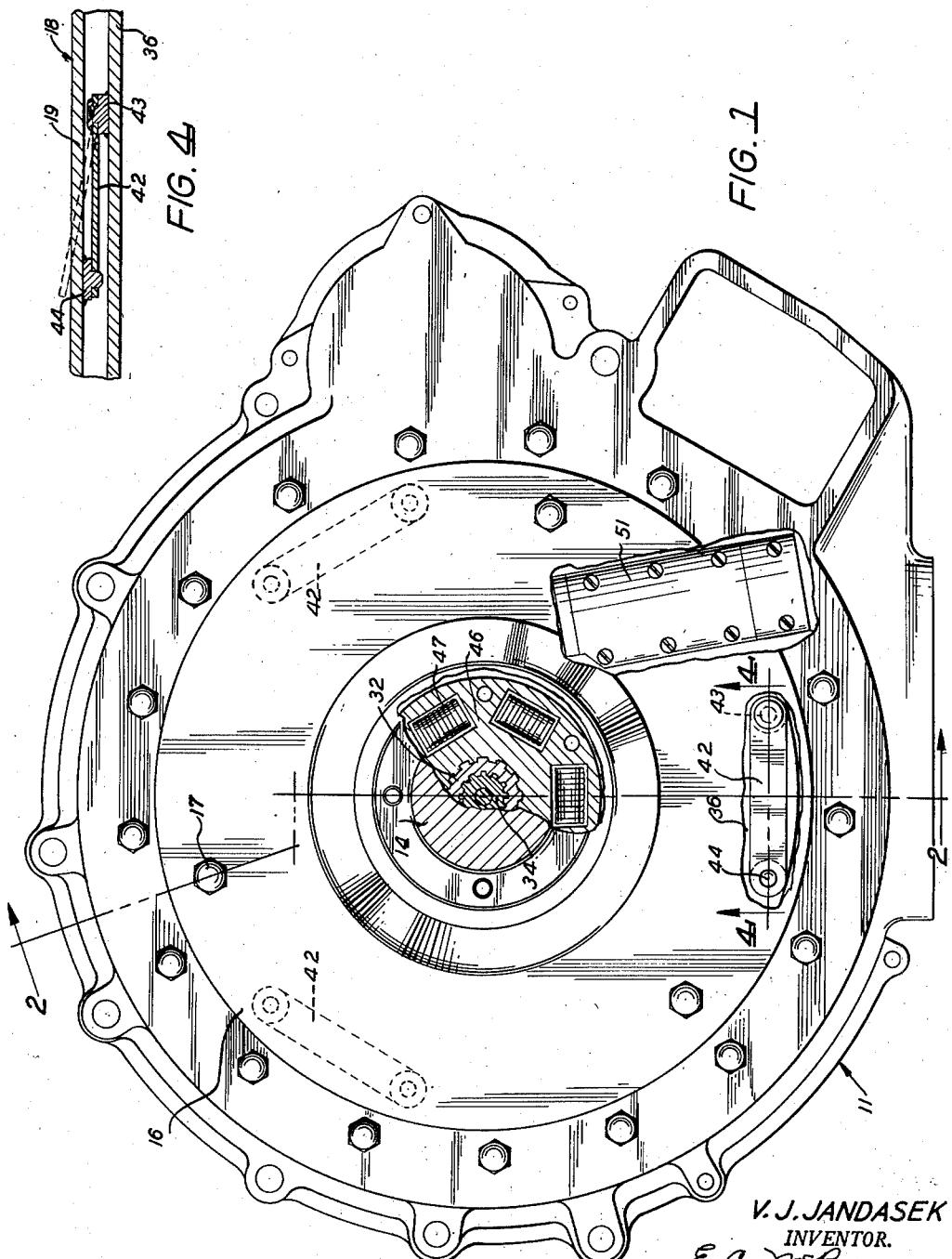
V. J. JANDASEK
INVENTOR.
BY E. C. McRae
J. R. Faulkner
L. H. Oster
ATTORNEYS May 28, 1957  V. J. JANDASEK  2,793,726
HYDRAULIC TORQUE CONVERTER
Filed May 5, 1954  2 Sheets-Sheet 2

V. J. JANDASEK
INVENTOR.

BY
ATTORNEYS

United States Patent Office 2,793,726
Patented May 28, 1957

2,793,726

HYDRAULIC TORQUE CONVERTER

Vladimir J. Jandasek, Detroit, Mich., assignor to Ford Motor Company, Dearborn, Mich., a corporation of Delaware Application May 5, 1954, Serial No. 427,812

4 Claims. (Cl. 192—3.2)

This invention relates generally to a torque converter for a motor vehicle transmission, and has particular reference to a torque converter embodying a direct drive clutch.

An object of the invention is to provide a hydraulic torque converter for a motor vehicle transmission incorporating a direct drive clutch adapted to be selectively applied by converter fluid pressure. A further object is to provide such a construction in which the annular piston for applying the direct drive clutch also forms the separating wall between the converter and the clutch, thus simplifying the construction of the unit and eliminating the necessity for a separate wall therebetween. Clutch disengagement for normal converter operation is obtained by providing communication between the clutch chamber and the converter chamber so that the fluid pressure on opposite sides of the clutch applying piston is counterbalanced, with spring means providing sufficient differential force to hold the clutch disengaged or to release the clutch after having been engaged. Engagement of the direct drive clutch is obtained by connecting the clutch chamber to exhaust and simultaneously blocking communication between the clutch chamber and the converter chamber, so that the fluid pressure in the converter chamber overrides the clutch release springs to engage the clutch.

Other objects and advantages of this invention will be made more apparent as this description proceeds, particularly when considered in connection with the accompanying drawings, wherein:

Figure 1 is an end elevational view, partly broken away and in section, of the construction of the present invention.

Figure 4 is a cross sectional view through the clutch release spring, taken on the plane indicated by the line 4—4 of Figure 1.

Figure 2:
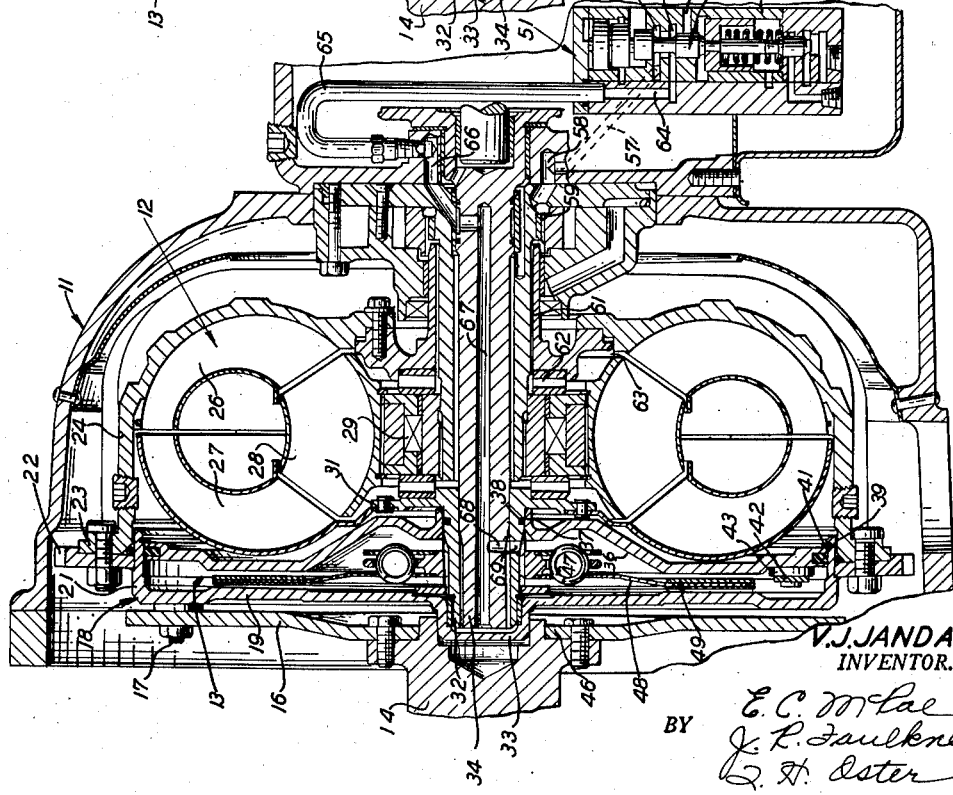
Figure 2 is a vertical cross sectional view taken on the plane indicated by the line 2—2 of Figure 1, and showing the direct drive clutch in disengaged position.

Referring now to the drawings, and particularly to Figure 2, the reference character 11 indicates a transmission housing containing a torque converter indicated generally by the reference 12 and a direct drive clutch indicated generally by the reference character 13. An input shaft 14 driven by the vehicle has secured thereto a drive plate 16 which in turn is secured adjacent its periphery by means of fastening elements 17 to an end cover 18. The end cover 18 has a radially extending flange 19 and an annular peripheral flange 21 forming a short axially extending cylinder of relatively large diameter. A toothed starter ring 22 is welded to the annular peripheral flange 21 of the end cover 18 and has bolted thereto the marginal flange 23 of the torque converter shroud 24.

The torque converter 12 has conventional impeller blades 26, turbine blades 27 and stator blades 28. The impeller blades 26 are carried by the converter shroud 24 and consequently are directly driven by the input shaft 14. The stator blades 28 are conventionally connected through an overrunning clutch 29 to the torque converter housing. The turbine blades 27 are connected to the flange 31 of a sleeve 32 rotatably mounted in the central portion 33 of the radial flange 19 of the end cover plate 18, and is splined to the output or driven shaft 34 extending centrally through the transmission housing.

Separating the torque converter 12 from the direct drive clutch 13 is a piston 36. The piston 36 is provided with an axially extending flange 37 slidably mounted upon the sleeve 32. A sealing ring 38 forms a seal between the sleeve and the piston. The outer peripheral margin of the piston 36 carries a sealing ring 39 engageable with the interior surface of the cylindrical portion 21 of the end cover plate 18 to form a seal therewith while permitting axial sliding movement of the piston within the cylinder. A ring 41 carried by the cylindrical portion 21 of the end cover plate forms a stop limiting movement of the piston toward the torque converter 12.

With reference now to Figures 1 and 4, it will be seen that the piston 36 is constantly urged toward the torque converter 12 by a series of three flat springs 42. One end of each flat spring 42 is rotatably mounted upon a pivot block 43 welded to the piston 36 while the opposite end of the spring is rotatably connected to a pivot block 44 welded to the radial end wall 19 of the end cover member 18. As will be seen in Figure 4, each flat spring 42 in its free position occupies the position shown in dotted lines, so that when assembled between the piston and the end wall the spring is under tension constantly urging the piston toward the converter. In addition, the spring 42 prevents rotation of the piston within the cylinder 21.

The direct drive clutch 13 comprises a clutch hub 46 splined to the sleeve 32 and consequently nonrotatably connected thereto and slidable axially thereon. The clutch hub 46 is connected by cushion springs 47 to a clutch disc 48 extending between the piston 36 and the end wall 19 of the cover member 18. Adjacent its outer periphery the clutch disc 48 carries a friction disc 49 on each side thereof.

It will be apparent that axial movement of the piston 36 to the left as shown in Figure 2 will clamp the friction linings 49 of the clutch disc 48 between the piston 36 and the end wall 19 of the cover member 18, and consequently will effect a direct mechanical connection between the input shaft 14 and the driven shaft 34, bypassing the torque converter 12.

In the present instance engagement and disengagement of the direct drive clutch 13 is effected by controlling the application of the fluid pressure within the torque converter 12 to opposite sides of the piston 36. For this purpose, a control valve 51, in addition to performing other functions in connection with the transmission, controls the engagement and disengagement of the direct drive clutch 13. The control valve 51 includes a spool valve member 52 axially movable within the valve housing 53 under suitable conventional governor and throttle actuation (not shown). The valve housing 53 has a pair of annular passageways 54 and 56 formed therein spaced from each other axially along the valve 52. The passageway 54 is connected to the interior of the torque converter 12 through a series of interconnecting passageways 57, 58, 59, 61, 62 and 63, while the passageway 56 in the valve housing is connected to the direct drive clutch chamber through a series of passageways 64, 65, 66, 67, 68 and 69.

In the position of the spool valve 52 as shown in Figure 2, it will be noted that communication is established between the passageways 54 and 56 in the valve housing 53, and consequently through the passageways mentioned above fluid communication is established between the clutch chamber on the left side of the piston 36 and the converter chamber on the right side of the piston. This enables the fluid pressure in the torque converter on the right side of the piston 36 to be applied to the clutch side of the piston to establish a counterbalanced condition. Under this counterbalanced condition the flat leaf springs 42 are effective to urge the piston 36 toward the converter chamber and against the stop ring 41, thus disengaging the direct drive clutch 13. With the clutch disengaged the drive from the input shaft 14 to the driven shaft 34 is through the torque converter 12.

Figure 3:
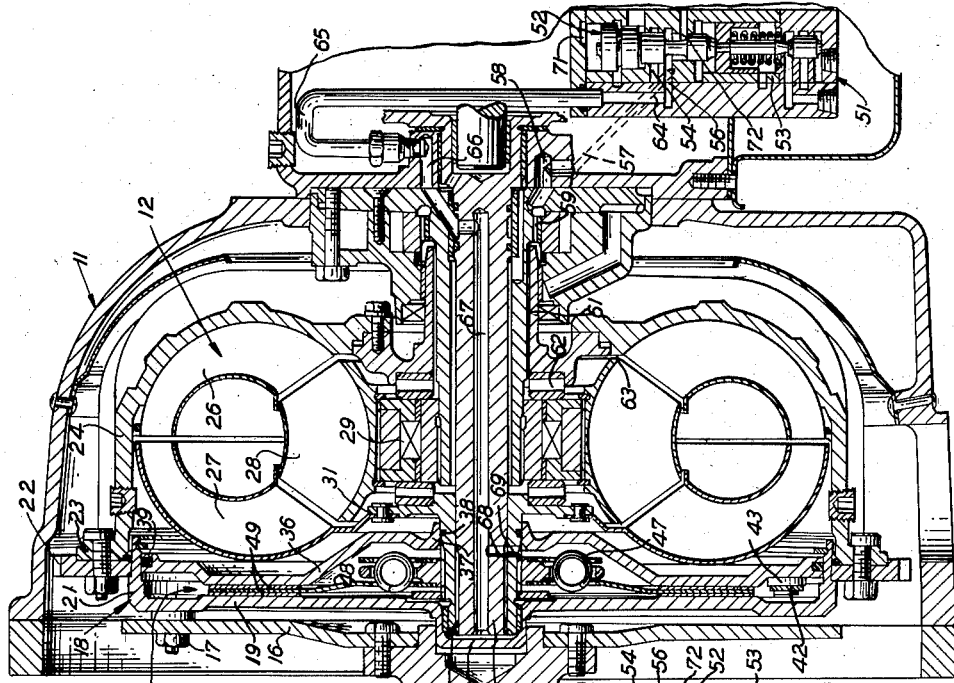
Figure 3 is a cross sectional view similar to Figure 2, but showing the direct drive clutch in engaged position.

When the motor vehicle achieves a predetermined speed the spool valve 52 is moved within the valve housing 53 to the position shown in Figure 3 in which the portion 71 of the valve blocks communication between the passageways 54 and 56 leading respectively to the converter chamber and the clutch chamber. Simultaneously, communication is established by the valve 52 between the passageway 56 in the valve housing and the exhaust passageway 72 therein. This connects the direct drive clutch chamber at the left side of the piston 36 to exhaust so that the fluid pressure in the converter housing is applied only to the right hand side of the piston 36. The pressure of the converter fluid against the piston is sufficient to overcome the resistance afforded by the three leaf springs 42, and consequently the piston 36 is moved to the left, clamping the friction facings 49 between the piston 36 and the end wall 19 of the cover member 18. The resulting engagement of the direct drive clutch 13 establishes a direct mechanical drive from the input shaft 14 to the driven shaft 34 and by-passes the torque converter 12.

Release of the direct drive clutch is effected whenever the control valve is moved to the position shown in Figure 2 to re-establish communication between the clutch and converter chambers on opposite sides of the piston 36 so as to provide a counterbalancing force thereon.

It will be understood that the invention is not to be limited to the exact construction shown and described, but that various changes and modifications may be made without departing from the spirit and scope of the invention, as defined in the appended claims.

What is claimed is:

1. In a transmission for a motor vehicle, an input shaft, an end cover plate driven by said input shaft, a shroud secured to said cover plate and forming therewith a torque converter housing, a piston mounted for axial sliding movement within said torque converter housing and dividing the latter into a clutch chamber and a converter chamber, an impeller within said converter chamber carried by said shroud, a driven shaft axially aligned with said input shaft, a turbine within said converter chamber connected to said driven shaft, a friction clutch disc within said clutch chamber intermediate the end cover plate and the piston, said clutch disc being nonrotatably and axially slidably mounted, spring means urging said piston away from said end cover plate, a control valve, a conduit establishing communication between said control valve and said clutch chamber, a second conduit establishing communication between said control valve and said converter chamber, said control valve in one position thereof establishing communication between said two conduits to balance the fluid pressure in said clutch and converter chambers to enable said spring means to hold said piston out of engagement with said friction clutch disc, and said control valve in a second position closing communication between said two conduits and establishing communication between the conduit from said clutch chamber to exhaust to enable the pressure in the converter chamber to override said spring means and to apply said friction clutch disc to said end cover plate to effect a direct mechanical drive from said input shaft to said driven shaft.

2. The structure defined by claim 1 which is further characterized in that said spring means comprises a plurality of angularly spaced flat springs intermediate said end cover plate and said annular piston, each of said flat springs having one end secured to said end plate and the opposite end secured to said annular piston to prevent rotation of said piston.

3. In a transmission for a motor vehicle, a torque converter housing having a shroud and an end cover plate closing the open end of said shroud, an input shaft connected to said cover plate, a driven shaft axially aligned with said input shaft and extending concentrically through said converter housing, a piston mounted for axial sliding movement within said converter housing and dividing the latter into two chambers, a friction clutch member in one of said chambers between said end cover plate and said piston, said clutch member being nonrotatably and slidably mounted upon said driven shaft, a plurality of springs within said first chamber urging said piston axially away from said end cover plate, converter blading within the second of said chambers between said piston and said shroud, means establishing communication between said first and second chambers to equalize the fluid pressure on opposite sides of said piston and enable said springs to hold said piston in clutch disengaging position, and valve means completely closing the communication between said first and second chambers and simultaneously establishing communication between said first chamber and exhaust to enable the fluid pressure in said second chamber to overcome said springs and move said piston toward said end cover plate into clutch engaging position.

4. In a transmission for a motor vehicle, an input shaft, a drive plate secured to said input shaft, a torque converter housing member having an end wall secured to said drive plate and an annular peripheral flange forming a cylinder, a second torque converter housing member overlapping the annular peripheral flange of said first housing member and secured thereto, an impeller carried by said second housing member, a driven shaft axially aligned with said input shaft and extending concentrically through said second housing member, a turbine within said second housing member connected to said driven shaft, a clutch friction disc positioned within the cylinder portion of said first converter housing member adjacent the end wall thereof, said friction disc being nonrotatably connected to said driven shaft and mounted for axial sliding movement with respect thereto, a piston slidably mounted within the cylinder portion of said first housing member, said piston being located between said clutch friction disc and said converter turbine to form a clutch chamber on one side of the piston and a converter chamber on the other side thereof, valve means forming the sole communication between the clutch chamber and the converter chamber, spring means urging said piston toward said converter chamber to maintain said clutch in disengaged position, valve means being movable to a position closing the sole communication between said clutch chamber and said converter chamber and simultaneously connecting said clutch chamber to exhaust to enable the fluid pressure in said converter chamber to override said spring means and clamp said clutch friction disc between said piston and the end wall of said first housing member to establish a direct mechanical drive between said input and said driven shafts.

References Cited in the file of this patent

UNITED STATES PATENTS

| 2,529,400 | Lapsley | Nov. 7, 1950 |
| 2,613,503 | Syrovy | Oct. 14, 1952 |

FOREIGN PATENTS

| 668,839 | France | Nov. 7, 1929 |